(12) United States Patent
Poster

(10) Patent No.: US 6,676,526 B1
(45) Date of Patent: Jan. 13, 2004

(54) COUPLING ANTI-FLAIL CUP

(75) Inventor: Scott D. Poster, Arlington, TX (US)

(73) Assignee: Bell Helicopter Textron, Inc., Fort Worth, TX (US)

( * ) Notice: Subject to any disclaimer, the term of this patent is extended or adjusted under 35 U.S.C. 154(b) by 0 days.

(21) Appl. No.: 09/690,646

(22) Filed: Oct. 17, 2000

(51) Int. Cl.⁷ .............................. F16D 3/79
(52) U.S. Cl. ........................ 464/99; 464/170
(58) Field of Search .............. 464/23, 93, 98, 464/94, 99, 95, 170, 171; 403/11, 23; 285/117; 74/609

(56) References Cited

U.S. PATENT DOCUMENTS

| | | | | |
|---|---|---|---|---|
| 1,261,683 A | * | 4/1918 | Behn ........................ | 464/98 |
| 1,376,504 A | * | 5/1921 | Behn ........................ | 464/95 |
| 1,419,351 A | * | 6/1922 | Bethel ...................... | 74/609 |
| 1,422,339 A | * | 7/1922 | Church ...................... | 464/95 |
| 1,460,594 A | * | 7/1923 | Le Moon ................... | 464/95 |
| 1,911,846 A | * | 5/1933 | Queen ....................... | 464/94 |
| 3,058,556 A | * | 10/1962 | Marland ................... | 464/93 X |
| 3,630,049 A | * | 12/1971 | Feller et al. ............... | 464/93 |
| 4,201,513 A | | 5/1980 | Sales | |
| 4,210,213 A | * | 7/1980 | Louviere .................. | 74/609 X |
| 4,216,842 A | * | 8/1980 | Decouzon ................ | 464/93 X |
| 4,475,869 A | | 10/1984 | Davies | |
| 4,871,296 A | | 10/1989 | Laessle et al. | |
| 5,700,198 A | * | 12/1997 | Takano ..................... | 464/93 X |
| 2003/0139216 A1 | * | 7/2003 | Zilberman et al. ........ | 464/94 |

* cited by examiner

Primary Examiner—Greg Binda
(74) Attorney, Agent, or Firm—James E. Walton

(57) ABSTRACT

The present invention provides an anti-flail cup(18) having a flange(20) attachable to an end of a shaft(10). The flange(20) has a perimeter and a face. A shoulder(22) extends from the perimeter of the flange(20) and generally perpendicularly to the face of the flange(20). The shoulder(22) of the anti-flail cup(18) surrounds a coupling(12) between two shafts(10) and retains the shaft(10) ends if the coupling(12) fails.

3 Claims, 2 Drawing Sheets

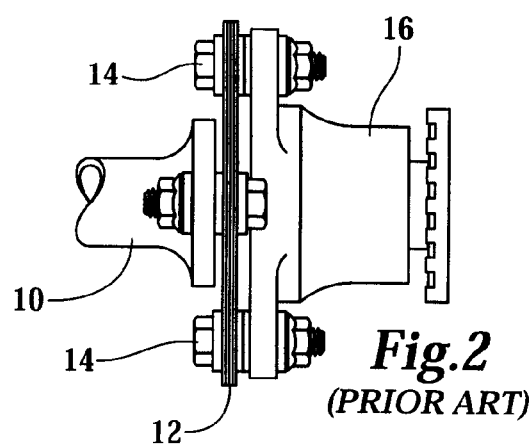
*Fig.2*
(PRIOR ART)
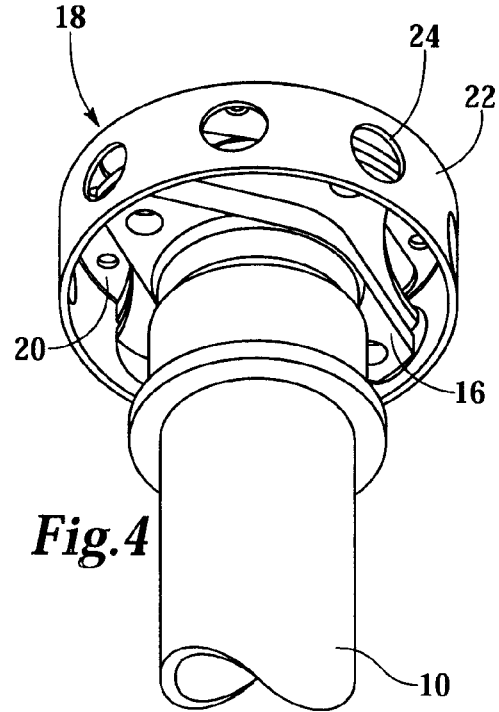
*Fig.4*
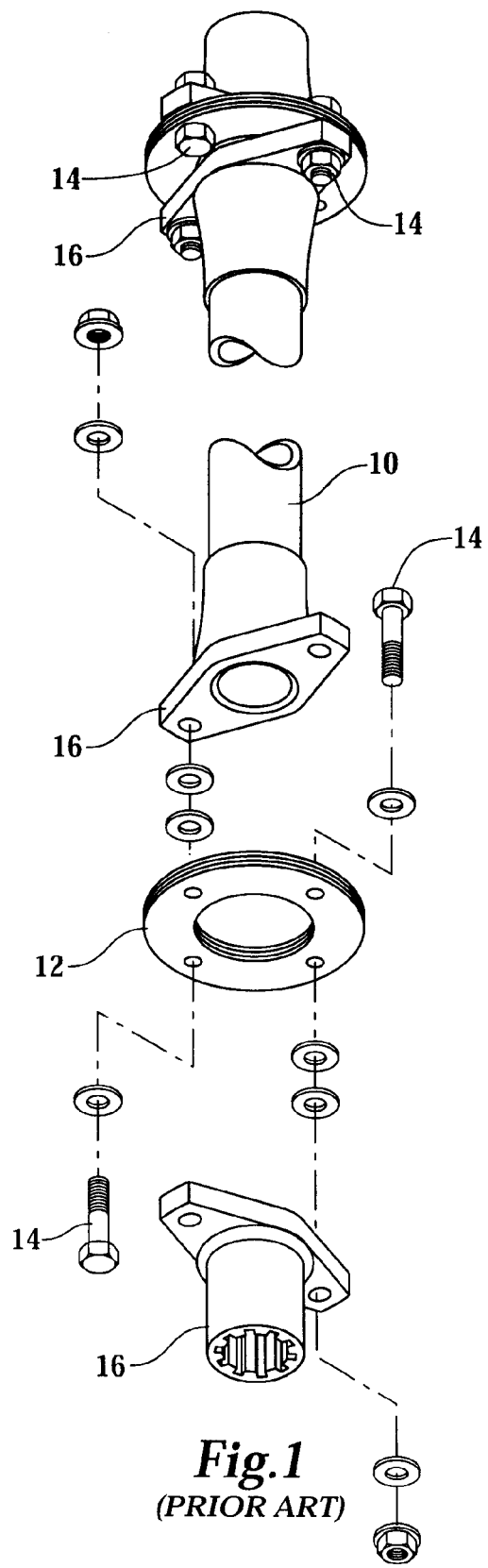
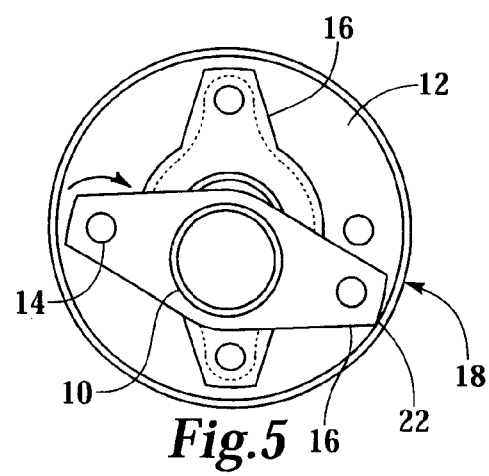
*Fig.1*
(PRIOR ART)
*Fig.5*

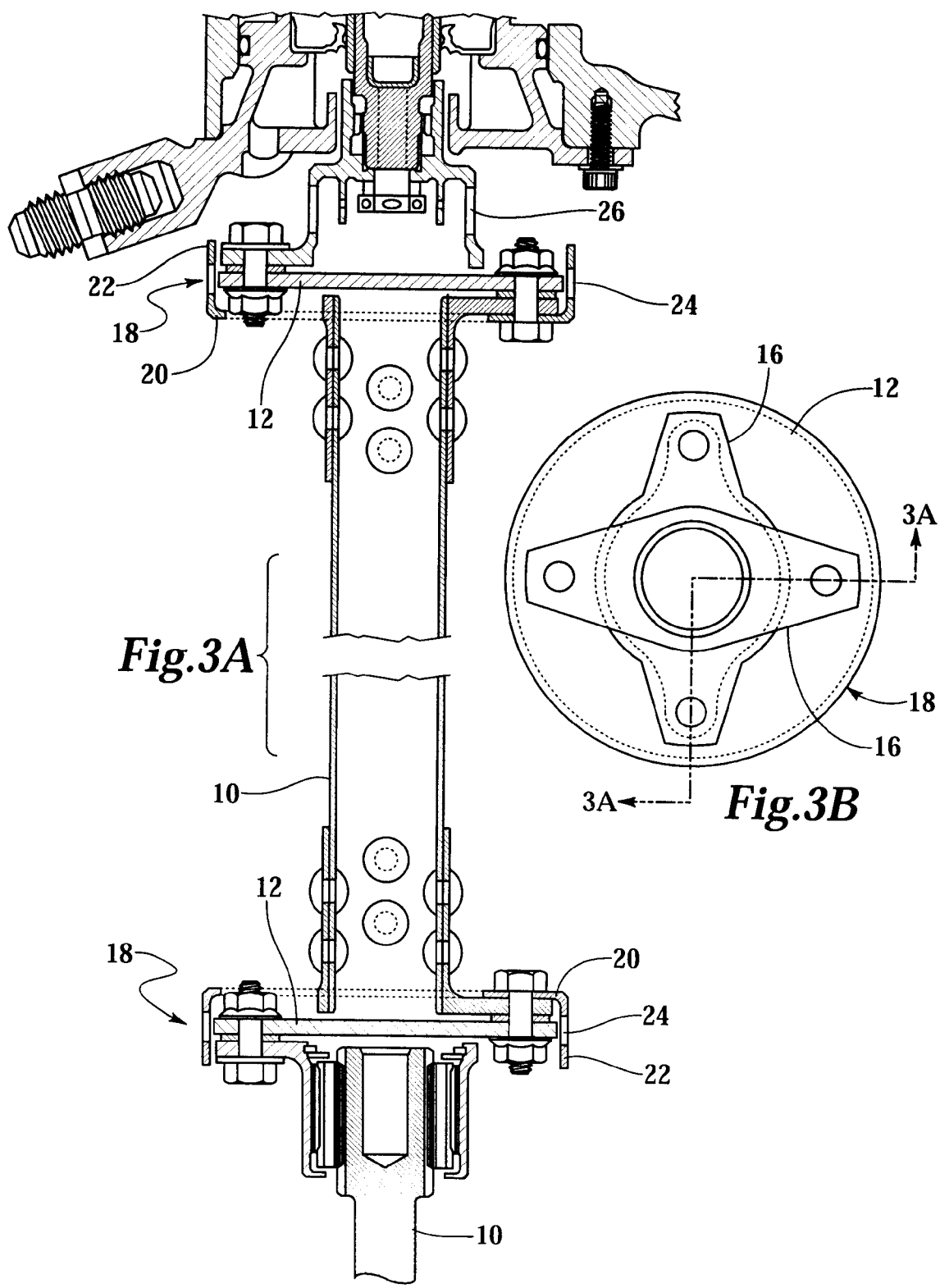

COUPLING ANTI-FLAIL CUP

TECHNICAL FIELD OF THE INVENTION

This invention relates in general to the field of shaft couplings and in particular to a device for preventing flailing of a drive shaft having a failed torque transmission coupling and/or loss of a coupling fastener.

BACKGROUND OF THE INVENTION

Without limiting the scope of the invention, its background will be described with reference to drive shaft couplings in helicopters as an example.

Helicopter engines provide power to several major components such as the main rotor, the tail rotor and the blower. The engines drive transmissions, which transmit rotational power to the components through various drive shafts. To ease installation and maintenance and to accommodate installed and induced angles, drive shaft segments may be coupled with torque-transmitting flexible diaphragm or disk joints such as THOMAS® couplings, for example.

THOMAS® couplings, manufactured by REXNORD®, are non-lubricated, metal flexing couplings, having non-wearing parts to transmit torque and accommodate shaft misalignment. The flexible element is a series of precision stamped discs with uniquely designed cross sections that flex without causing the metal-to-metal wear problems associated with lubricated couplings. The series of discs are engineered for infinite life if the coupling is operated within specified environmental and load conditions. This conservative design standard assures maximum reliability on the most critical drive systems.

The most reliable mechanical system, however, remains susceptible to failures that are a result of material fatigue, manufacturing defects and human factors. THOMAS® couplings have several failure modes. For example, a coupling fastener that is under-torqued may become unfastened by vibration from the aircraft. Losing a coupling fastener will cause shaft to rotate out of alignment and the eccentric rotation will cause a catastrophic coupling failure. An over-torqued coupling fastener may cause stress fractures in the coupling discs, which may result in the discs shearing from the fasteners. Again, this will cause the shaft to rotate out of alignment, which results in coupling failure.

After a coupling failure, the free end of the shaft flails about and causes significant damage. The shaft driving the tail rotor, for example, rotates at a speed of approximately six-thousand one-hundred revolutions per minute (RPM). The tail rotor shaft includes several drive shaft segments that are coupled using THOMAS® couplings. A coupling failure releases a free end of one of the segments that is flailing at about six-thousand one-hundred RPM. The free end of the shaft segment may then tear the tail section from the aircraft, which results in a loss of directional stability. A flailing shaft may also damage or destroy- other proximate aircraft systems. For example, the blower shaft, which is rotating at approximately ten-thousand RPM, may destroy the aircraft's hydraulic system if the coupling fails.

Therefore, a need has arisen for a shaft coupling assembly that will not allow the free end of the shaft to flail if the coupling fails. A need has also arisen for such a coupling assembly that does not add significant cost, complexity or weight to the aircraft drive systems. Further, a need has arisen for such a shaft coupling assembly that may be fitted to existing drive shafts.

SUMMARY OF THE INVENTION

The present invention disclosed herein provides an anti-flail assembly for preventing an uncoupled end of a rotating shaft from flailing. The anti-flail assembly has a flange, which has a face and a perimeter. The flange is attachable to an end of a shaft. A shoulder extends from the perimeter of the flange generally perpendicularly to the face of the flange. The shoulder of the anti-flail cup surrounds a shaft coupling and retains the shaft ends if the coupling fails.

In one embodiment of the present invention, a method for preventing an end of a rotating shaft from flailing is provided. The method includes attaching an anti-flail cup to an end of a first shaft. A second shaft is coupled to the end of the first shaft such that the anti-flail cup extends from the end of the first shaft to the coupled end of the second shaft.

In another embodiment of the invention, an anti-flail system includes a first shaft coupled to a second shaft by a coupling. An anti-flail cup is attached to the first shaft. The anti-flail cup retains the ends of the first shaft and the second shaft if the coupling fails.

BRIEF DESCRIPTION OF THE DRAWINGS

For a more complete understanding of the present invention, including its features and advantages, reference is now made to the detailed description of the invention taken in conjunction with the accompanying drawings in which like numerals identify like parts and in which:

FIG. 1 is a perspective view of a shaft and coupling assembly according to the prior art;

FIG. 2 is a side view of a shaft and coupling assembly according to the prior art;

FIG. 3A is a cross-section along line 3A—3A of a shaft and coupling assembly incorporating certain embodiments of the invention;

FIG. 3B is an end view of a shaft and coupling assembly incorporating certain embodiments of the invention;

FIG. 4 is a perspective view of a shaft assembly incorporating certain embodiments of the invention; and FIG. 5 is an end view of a shaft and coupling assembly incorporating certain embodiments of the invention.

DETAILED DESCRIPTION OF THE INVENTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention and do not delimit the scope of the invention.

Referring now to FIGS. 1 and 2, therein is depicted a shaft 10 having a cylindrical coupling 12 according to the prior art. The shaft 10 may have a lug 16, which is secured to an end of the shaft 10. Fasteners 14 may be used to secure the coupling 12 to the lugs 16 of the two shafts 10, thereby providing a flexible union between the shafts 10. The coupling 12 may transmit rotational forces between the shafts 10.

The lugs 16 may be machined or cast as a part of the shaft 10. The lugs 16 may also be separate components that are splined, welded, riveted or otherwise mechanically joined to the shaft 10. The shaft 10 may be made from aluminum, steel, carbon fiber, or other material suitable for shaft construction.

The coupling 12 may be made from stacked, die-cut metallic discs, which are drilled to accept fasteners 14. The fasteners 14 may be bolts and nuts having rounded washers that are designed to minimize stress concentrations on the coupling 12. The lugs 16 may be attached to opposite sides of the coupling 12. One lug 16 may be rotated approximately ninety degrees from the other lug 16. Shaft misalignment totaling several degrees may be compensated by flex in the coupling 12.

Typically, four fasteners 14 are spaced at 90 degree intervals around the coupling 12. Each lug 16 is fastened to the coupling by two fasteners 14, which are spaced approximately 180 degrees apart. This configuration practically creates a universal joint similar to the type found in automobile drive shafts. The flexible discs that comprise the coupling 12 allow for offset alignment of the axes of the drive shafts 10.

Turning now to FIGS. 3 and 4, a shaft assembly incorporating an anti-flail cup 18 is depicted. The anti-flail cup 18 may have a circular flange 20 and a circular shoulder 22. The anti-flail cup 18 may be fastened to the lug 16 through the flange 20. The anti-flail cup 18 may also be fabricated with an integral lug 16, which may be attached to the shaft 10. The anti-flail cup 18 may also be fabricated integral with the shaft 10. In this particular embodiment, the lug. 16 may not be necessary or the lug 16 may be integral with the assembly. For example, the shaft 10, lug 16 and anti-flail cup 18 may be cast or machined from a single piece of material. In another embodiment, the shaft 10, lug 16 and anti-flail cup 18 may be manufactured separately and then fused, bonded or welded together to form an integral structure.

The shoulder 22 may extend from the perimeter of the flange 20 and generally perpendicularly from a face of the flange 20. In this particular embodiment, the shoulder 22 extends generally along the axis of drive shaft 10 and past the cylindrical coupling 12 and a portion of the adjoining lug 16, or past the entire thickness, or outer face, of lug 16, as is best seen in FIG. 4.

The anti-flail cup 18 may be a light-weight to maintain aircraft and drive system efficiency. The anti-flail cup 18 may be made from, for example, steel, aluminum, titanium, carbon fiber, and the like. The shoulder 22 may have an inside diameter slightly larger than the length of the lug 16. The dimension of the inside diameter allows for fastening the coupling 12 to the lugs 16, but is not large enough to allow a lug 16 having only fastener 14 to rotate too far out of alignment with the mating shaft 10.

The thickness of the flange 20 and shoulder 22 need only be sufficient to support loads from the rotation of the lug 16 and the drive shaft 10. If the coupling 12 or a fastener 14 fails, the shoulder 22 may also support frictional loads caused by the free end of the lug 16 wedging into the shoulder 22. The shoulder 22 may retain the lug 16 and shaft 10 to postpone catastrophic failure if the coupling 12 or a fastener 14 fails.

The flange 20 may have an opening to allow the anti-flail cup 18 to fit over the lug 16. This allows the anti-flail cup 18 to be easily attached to an existing drive shaft 10 assembly. Bolt holes in the flange 20 may correspond to the bolt patterns of several different sizes of lugs 16. The anti-flail cup 18 may be attached to the lug 16 and the coupling 12 using the fasteners 14.

The shoulder 22 may have view ports 24 to visually check the coupling 12. The view ports 24 may simply be holes drilled or cast into the shoulder 22 at different spacing intervals. The view ports 24 may also serve to reduce the weight of the anti-flail cup 18.

Maintenance personnel may visually inspect the condition of the coupling 12 through the view ports 24. The coupling 12 may be comprised of a stack of metallic discs requiring a particular orientation. This orientation may be determined by locating a notch on an individual disc to indicate a particular grain direction. The durability of coupling 12 may be increased by orienting the discs at ninety degrees relative to each other. Maintenance personnel may use the view ports 24 to ensure that notches on adjacent discs of the coupling 12 are not aligned, which indicates proper orientation.

The drive shaft 10 may also be coupled to a gearbox drive 26 using the coupling 12. The gearbox drive 26 transmits power from an aircraft engine to various aircraft components, such as a blower or a tail rotor, for example. The anti-flail cup 18 may be used for the coupling 12 between the drive shaft 10 and the gearbox drive 26. The anti-flail cup 18 may also be installed on a coupling 12 between two drive shafts 10.

Referring now to FIG. 5, the coupling 12 is depicted after a failure. The coupling 12 may have several different failure modes. In one failure mode, one fastener 14 may become detached from the coupling 12 by vibration from the aircraft. In another failure mode, an over-torqued fastener 14 may cause stress fractures in the coupling 12. In this mode, the coupling 12 may shear from the fastener 14. Either of these failure modes causes one side of the lug 16 to rotate about the remaining fastener 14.

In the absence of the anti-flail cup 18, the drive shaft 10 may be twisted eccentrically and eventually cause complete failure of coupling 12. The drive shafts 10 become more misaligned as rotation continues. Because the drive shafts 10 may be rotating at 10,000 RPM, large differences in shaft alignment create extreme forces on the remaining fastener 14. Eventually, the entire coupling 12 will fail, which allows the free end of the drive shaft 10 to flail out of control and cause damage to vital aircraft components.

The anti-flail cup 18 may serve to capture the lug 16 for a period of time to allow a pilot of the aircraft to make an emergency landing. If the coupling 12 fails at one fastener 14, the lug 16 may rotate slightly about the remaining fastener 14 until the free end of the lug 16 becomes wedged against the shoulder 22 of the anti-flail cup 18. The anti-flail cup 18 prevents the lug 16 and the drive shaft 10 from becoming extremely eccentric. After a failure, the pilot may feel additional vibration caused by the slightly eccentric rotation of the drive shaft 10. This additional vibration may alert the pilot of a coupling failure and allow time for an emergency landing.

The anti-flail cup 18 may also prevent the shaft from flailing if up to two non-adjacent fasteners 14 fail. If one fastener 14 fails, the free end of the lug 16 will wedge into the shoulder 22 of the anti-flail cup 18 and may prevent catastrophic failure of drive shaft 10 for a period of time. If another fastener 14 within the same coupling 12 and not adjacent to the first fastener 14 fails, the opposite lug 16 attached to the coupling 12 will also rotate and wedge into the shoulder 22. Although this scenario may not be likely, the anti-flail cup 18 can maintain the integrity of drive shaft 10 until the pilot may execute an emergency landing.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is, therefore, intended that the appended claims encompass any such modifications or embodiments.

What is claimed is:

1. An anti-flail shaft assembly comprising:

a first shaft having a first attachment flange;

a second shaft having a second attachment flange;

a flexible multi-disk coupling member coupled to the first attachment flange with a first set of fasteners and coupled to the second attachment flange with a second set of fasteners, such that the first attachment flange and the second attachment flange are not directly fastened to each other;

a rigid anti-flail cup member having a radial base portion and a rigid shoulder portion, the radial base portion being coupled to the first attachment flange, and the rigid shoulder portion extending longitudinally from the first attachment flange beyond the flexible multi-disk coupling member and the second attachment flange; and a radial clearance between the second attachment flange and the rigid shoulder;

wherein failure of the flexible multi-disk coupling member, a fastener of the first set fasteners, or a fastener of the second set of fasteners, results in a selected eccentric rotation of the first shaft relative to the second shaft, such that torque is transmitted from the first shaft to the second shaft through the rigid shoulder.

2. The anti-flail shaft assembly according to claim 1, wherein the selected eccentric rotation generates a detectable vibration indicative of the failure.

3. The anti-flail shaft assembly according to claim 1, wherein the rigid anti-flail cup member is integral with the first shaft.

* * * * *